United States Patent Office 3,549,481
Patented Dec. 22, 1970

3,549,481
ADHESION OF TEXTILE FIBER TO RUBBER WITH POLYHYDRIC PHENOL-FORMALDEHYDE-TRIS (2-HYDROXYALKYL)ISOCYANURATE RESIN
Frank C. Cesare and William D. Loeble, Jr., Columbia, S.C., assignors to Uniroyal, Inc., New York, N.Y., a corporation of New Jersey
No Drawing. Continuation-in-part of application Ser. No. 786,439, Dec. 23, 1968. This application May 6, 1969, Ser. No. 824,022
Int. Cl. B32b 17/10, 25/08; C08g 5/18
U.S. Cl. 161—198      15 Claims

ABSTRACT OF THE DISCLOSURE

Improved adhesion of fiber (e.g., rayon, nylon, polyester, glass) to rubber is obtained with the aid of a polyhydric phenol - formaldehyde - tris(2 - hydroxyalkyl)isocyanurate resin, such as a resorcinol-formaldehyde-tris(2-hydroxyethyl)isocyanurate resin. The resin is used in an adhesive dip containing rubber latex.

CROSS-REFERENCE TO RELATED APPLICATION

This application is a continuation-in-part of our copending application Serial No. 786,439, filed December 23, 1968, now abandoned. The present application emphasizes a highly preferred form of the invention in which the resin is made from molten resorcinol.

BACKGROUND OF THE INVENTION

(1) Field of the invention

The invention relates to (1) polyhydric phenolformaldehyde-tris(2-hydroxyalkyl)isocyanurate resin, (2) a method of making such resin, (3) adhesive compositions based on such resin, (4) a method of adhering textile fiber to rubber with the aid of such resin, and (5) improved textile fiber-rubber laminates produced with the aid of said resin.

(2) Description of the prior art

Adhesion of textiles to rubber with the aid of adhesive based on resorcinol-formaldehyde resin is well known (see, for example U.S. Reissue Pat. 23,451, Mighton, Jan. 15, 1952). It is also known to adhere certain fibers to rubber using compositions containing a resinous material produced by first reacting triallyl cyanurate with resorcinol and thereafter combining the resulting reaction product with formaldehyde (U.S. Pat. 3,318,750, Aitken, May 9, 1967). Triallyl cyanurate has the structural formula:

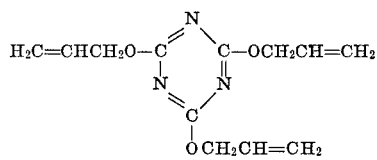

SUMMARY OF THE INVENTION

The invention is based on the surprising discovery that a novel polyhydric phenol-formaldehyde-tris(2-hydroxyalkyl)isocyanurate resin is remarkable for its ability to improve the adhesion of textile fibers to rubber. The structural formula for the preferred tri-(2-hydroxalkyl)isocyanurate, tris(2-hydroxyethyl)isocyanate, is:

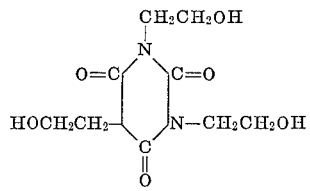

The preferred polyhydric phenol is resorcinol.

A highly preferred resin is made from the polyhydric phenol in a molten state, to which aqueous formaldehyde is added. Although the tris(2-hydroxyalkyl)-isocyanurate may be present during the reaction of the polyhydric phenol and the formaldehyde, a preferred practice involves first preparing polyhydric phenol-formaldehyde resin and thereafter reacting the resin with a tris(2-hydroxyalkyl)isocyanurate, to provide the desired modified resin.

The modified resin is employed as an adhesive composition, preferably in admixture with rubber latex, for treatment of textile material prior to laminating the textile to vulcanizable rubber stock. Upon subjecting the laminate to conventional vulcanizing conditions, the textile becomes firmly adhered to the rubber stock.

DETAILED DESCRIPTION AND PREFERRED EMBODIMENTS (i) Preparation of the tri(2-hydroxyethyl)isocyanurate-modified resorcinol-formaldehyde resin (a) The Starting Resorcinol-Formaldehyde Resin: Resorcinol-formaldehyde resin which is employed as the starting material in one method of making the present novel tris(2-hydroxyethyl)isocyanurate-modified resin, is itself a known material and may be described as a resinous, water-soluble reaction product made in known manner by condensing one mole of resorcinol with less than one mole of formaldehyde (e.g. from 0.3 to 0.9 mole of formaldehyde). Conventionally the condensation reaction between the resorcinol and formaldehyde is carried out in an aqueous medium and, optionally, a small, catalytic amount of a catalyst for such resin-forming condensation reaction may be employed. Catalysts conventionally used for this purpose include organic acids (e.g., oxalic acid, acetic acid, p-toluene sulfonic acid), inorganic acids (e.g., sulfuric acid, hydrochloric acid, boric acid), organic bases (e.g., morpholine, diethanolamine, ethylene diamine), and inorganic bases (e.g., calcium carbonate, oxides of calcium, strontium or zinc, sodium hydroxide). It is not mandatory to use catalyst. A common commercial practice is to prepare the resin with a base type catalyst such as morpholine and then "short-stop" (i.e., prevent the reaction from going too far with consequent cross-linking and formation of insoluble material) with oxalic acid. The condensation reaction takes place at ordinary ambient temperatures (e.g. 21° C.), but because the reaction is exothermic, elevated temperatures are ordinarily attained during the process of preparing the resin. In fact, it is desirable to add the formaldehyde gradually or in increments to control the evolution of heat. In practice it is usual to apply heat toward the end of the preparation, for example by heating at approximately refluxing temperature (reaction temperature about 90–100° C.) or the mixture may be heated at even higher temperatures, preferably not in excess of 135° C., although still higher temperatures (e.g. 150° C. or more) can be used. Suitable conventional resorcinol-formaldehyde resins are exemplified in U.S. Pat. 3,262,482, July 26, 1966, Clifton et al., by those partially reacted, soluble resins having a ball and ring softening point of 102°–112° C. A person desiring to practice the invention need not actually prepare the starting resorcinol-formaldehyde resin himself, since there are on the market a variety of commercially available resorcinol-formaldehyde resins from which a selection may be made, e.g., "Penacolite 2170," "Schenectady 1505 A," "Catalin 779" etc.

In accordance with a highly preferred practice of the invention the resorcinol-formaldehyde resin is prepared by heating the resorcinol in a molten state (M.P. about 110° C.) in admixture with a small, catalytic amount of one of the above-mentioned acidic or basic resin-forming catalysts. No water is present during the heating of the molten resorcinol-catalyst mixture, except for a possible small amount of water initially present in the catalyst. The melt is preferably heated to a temperature of at least 120° C., but not in excess of 135° C. After allowing the mixture to cool down somewhat (e.g. to a temperature not greater than about 100° C.) there is added to the resorcinol-catalyst mixture an aqueous solution of formaldehyde. The concentration of formaldehyde in the aqueous solution is not critical, and for convenience we frequently use ordinary formalin (about 37% formaldehyde by weight), but higher concentrations (e.g. 80% or more) or lower concentrations (e.g., 10% or less) may be used if desired. The reaction is conveniently carried out at approximately refluxing temperature (e.g., about 90°–100° C.) or higher, although it has been found desirable not to exceed a reaction temperature of about 135° C. The reaction is exothermic, and the temperature may be controlled by regulating the rate of addition of formaldehyde. Thus, the only water present (except for possibly a small amount of water in the catalyst) is that in the aqueous formaldehyde which is added slowly to the hot melt. This procedure produces a form of the desired resorcinol-formaldehyde resin which has surprisingly been found to be more efficacious for the present purposes than otherwise similar resorcinol-formaldehyde resin prepared from an aqueous solution of resorcinol.

If desired other resin-forming polyhydric phenol, such as catechol or pyrogallol for example, may be substituted for some or all of the resorcinol in preparing the resin. Usually the amount of formaldehyde will be from 0.15 to 0.45 mole per molar equivalent of phenolic hydroxyl in the polyhydic phenol.

It will be understood that in the foregoing preparation a source of or equivalent of formaldehyde, such as paraformaldehyde, may be substituted for formaldehyde itself.

(b) Modification of the resorcinol-formaldehyde resin with tris(2-hydroxyethyl)isocyanurate: As indicated previously, the invention involves modifying the resorcinol-formaldehyde resin with tris(2-hydroxyethyl)isocyanurate (hereinafter in most instances referred to simply as "THEIC," for the sake of convenience and brevity) is preferably added to the resorcinol-formaldehyde resin, conveniently to a solution of the resin, which will ordinarily be an aqueous solution of the resin. The proportion of THEIC [i.e., tris(2-hydroxyethyl)isocyanurate] employed is at least 1% based on the weight of the unmodified resorcinol-formaldehyde resin (dry basis) and usually ranges from 1 to 12%; preferably the amount of THEIC is about 5 or 6% of the weight of the unmodified resin. While there is no critical upper limit on the amount of THEIC that may be used, and larger amounts such as 15% or more may be used if desired, it will usually be found that there is no proportionate added advantage in such larger amounts of THEIC, and for reasons of economy larger amounts are ordinarily not used in practicing the invention. The medium in which the resorcinol-formaldehyde resin is present may be the same aqueous medium in which the resin was prepared, if desired. It is not necessarily to adjust pH before adding THEIC. The resorcinol-formaldehyde resin solution to which the THEIC is added may be basic, essentially neutral, or acidic.

Reaction between the added THEIC and the resorcinol-formaldehyde resin takes place readily, without any necessity for employing a catalyst. Although reaction takes place gradually at ordinary ambient temperatures (e.g., about 21° C. or less) it is preferred to shorten the time of reaction by heating the mixture to an elevated temperature (e.g., from 60° C. or less to 160° C. [under pressure] or more.) A convenient practice is to carry out the modification reaction at approximately refluxing temperature (e.g., 90–100° C.). For convenience, the THEIC may be added in the form of a solution, particularly an aqueous solution.

If desired, other tris(2-hydroxyalkyl)isocyanurates may be substituted for some or all of the tris(2-hydroxyethyl)isocyanurate in practicing the invention. Thus, for example, such tris(2-hydroxyalkyl)isocyanurates as tris(2-hydroxypropyl)isocyanurate, tris(2 - hydroxyisopropyl) isocyanurate, tris(2-hydroxybutyl)isocyanurate, tris (2-hydroxyisobutyl)isocyanurate, or corresponding mixed propyl-isopropyl products, or mixed butyl-isobutyl products, may be employed in the invention.

While it is not desired to limit the invention to any particular theory of operation, it is believed that the THEIC interacts chemically with the resorcinol-formaldehyde resin, possibly by partially cross-linking with the resin. However, the resin remains soluble, indicating that the cross-linking is not complete and the modified resin is capable of reacting with further added quantities of formaldehyde to form a cross-linked, cured, insoluble product. In any event, the observed fact is that the resorcinol-formaldehyde resin, or resin-forming reaction mixture, by treatment with THEIC, has new and unusual capabilities, in the form of the ability to provide improved adhesion, in comparison to resorcinol-formaldehyde not reacted with THEIC as will be made manifest in the working examples below.

The aqueous solution of THEIC modified resorcinol-formaldehyde resin may be stabilized by making it slightly basic, for example with a little sodium hydroxide solution. The resin solution is then stable indefinitely and gives good results even after storage. It is not necessary to isolate the modified resin, but this can be done if desired.

If desired, water can be removed from the modified resin preparation by distillation, but this is not necessary.

As an alternative to the described procedure, the THEIC may be present in the original reaction mixture of resorcinol and formaldehyde, to produce the desired modified resin "in situ" directly, without going through the separate stages of first preparing unmodified resorcinol resin and subsequently reacting the already preformed resin with THEIC. Such expressions as "THEIC modified resin" as used herein include not only the reaction product of preformed resin with THEIC, but also the reaction product obtained when THEIC is present along with the resin-forming ingredients in the original preparation of the resin. For example, the THEIC may be added to the original resorcinol-catalyst or the aqueous resorcinol solution before adding the aqueous formaldehyde or the THEIC may be added along with the aqueous formaldehyde to the resorcinol molt or to the aqueous resorcinol solution.

(ii) Use of THEIC-modified resorcinol-formaldehyde resin as adhesive

As indicated, the new THEIC-modified resorcinol-formaldehyde resin of the invention has unusual utility in the adhesion of textile materials to rubber. Thus, tire cord can be adhered more firmly to tire carcass rubber, or fabric reinforcement can be adhered to rubber more firmly in such laminated articles as timing belts, conveyor belts, coated fabrics, etc., by using the present THEIC-modified resorcinol-formaldehyde resin as an adhesive component. The superiority of the preferred form of the invention, in which the resin is prepared from molten resorcinol rather than an aqueous solution of resorcinol, is evidenced not only in improved adhesion to rayon fiber and glass fiber, but is particularly remarkable from the standpoint of improved adhesion to nylon fiber and polyester fiber. A highly preferred form of the invention therefore uses the resin from molten resorcinol in combination with nylon or polyester as the textile.

The rubbers which are adhered to textiles by the method izable saturated rubbers. These may be defined as diene polymer rubbers, and include not only homopolymers, such as the conjugated diolefin homopolymers, e.g., polybutadiene (whether of high cis content or otherwise, either solution prepared or emulsion-prepared) and polyisoprene (whether natural or synthetic), but also copolymers, whether copolymers of high unsaturation (50% or more) as in copolymers of such dienes as butadiene with copolymerizable monoethylenically unsaturated monomers such as styrene (e.g., emulsion-prepared or solution-prepared SBR), acrylonitrile, vinylpyridine, ethyl acrylate, etc., or whether copolymers of low unsaturation, as in copolymers of such diolefins as isoprene or butadiene with such isoolefins as isobutylene (e.g., butyl rubber) or copolymers of at least two different alpha-monoolefins (e.g., ethylene, propylene) with small amounts of copolymerizable polyenes as represented by cyclic or open-chain non-conjugated dienes, e.g., dicyclopentadiene, ethylidene norbornene, methylene norbornene, cyclooctadiene, tetrahydroindene, 1,4-hexadiene, etc. (known as "EPDM"). For use in the invention the rubber is of course compounded with the usual conventional ingredients including sulfur or sulfur-yielding vulcanizing agents, organic or inorganic accelerators of sulfur vulcanization, and if desired reinforcing fillers or pigments such as carbon black, silica, etc., as well as any such appropriate ingredients as antioxidants, antiozonants, processing aids, extender oils, tackifiers, lubricants, reclaim or other extenders, etc., as appropriate to the particular rubber used and the particular article being manufactured. The composition may contain more than one rubber e.g., a blend of NR and cis-BR, or a blend of butyl rubber and EPDM. The rubber composition may (especially in the case of pneumatic tire carcass stocks) if desired contain various conventional adhesion-promoting chemicals, such as those described in Belgian Pat. 683,718, July 6, 1966, United States Rubber Company, but the use of such adhesion-promoting chemicals is not essential.

To prepare a textile-rubber laminate with takes advantage of the remarkable adhesive qualities of the present THEIC modified resorcinol-formaldehyde resin, the textile material, prior to lamination with the rubber stock, is first associated with the modified resin of the invention in any appropriate manner. A preferred practice involves adding the modified resin of the invention to a rubber latex, and then applying the latex to the textile by any suitable conventional method such as dipping, spraying, brushing or spreading. The fabric thus becomes coated and/or impregnated with the modified resin composition. The rubber latex employed for this purpose may be a natural rubber latex or a synthetic rubber latex in which the rubber is any of the synthetic rubbers mentioned above. SBR latex may be used, but in many cases it is found preferable to use a vinylpyridine copolymer latex, notably a butadiene-vinylpyridine copolymer latex or a butadiene-styrene-vinylpyridine latex. A mixture of latices may be used, such as a mixture of SBR latex with vinylpyridine latex (butadiene-vinylpyridine or butadiene-styrene-vinylpyridine). Butyl latex is also useful, as in EPDM latex. Although in some cases the rubber of the latex in the adhesive composition will correspond to the general type or class of the rubber to which the textile is to be adhered (e.g., butyl latex may be used for adhering butyl rubber, EPDM latex may be used for adhering EPDM rubber) this is not always necessarily the case.

In mixing the present THEIC modified resorcinol-formaldehyde resin with rubber latex to make the adhesive dip, the same proportions and formulating principles may be observed as in the case of making an adhesive dip with conventional, unmodified resorcinol-formaldehyde resin. Thus, for example, the relative proportions of THEIC modified resorcinol-formaldehyde resin and rubber latex solids suitably may range from about 5 to 25 parts by weight of modified resin per 100 parts by weight of rubber latex solids, preferably 10 to 20 parts. The modified resin/latex adhesive composition preferably further contains formaldehyde (or equivalent formaldehyde-yielding substance) to advance the reaction of the modified resin, which, as indicated previously, is in a partially reacted state. The amount of formaldehyde to be added to the resin/latex solution is not critical and may vary with the particular modified resin employed and the amount of resin. In most cases, the amount of formaldehyde is within the range of from 5 to 30 parts by weight, preferably 5 to 20 parts, per 100 parts by weight of modified resin in the adhesive composition. The amount of formaldehyde added to the adhesive dip containing the present modified resin may be the same as conventionally employed in adhesive dips containing the ordinary, unmodified resorcinol-formaldehyde resin.

After application of the adhesive composition, for example by dipping the textile in the adhesive solution, the textile is then dried prior to lamination with the vulcanizable rubber stock to be adhered. As is usual in the case of latex adhesive treatments where the latex solution contains conventional unmodified resorcinol-formaldehyde resin, so in the present process the drying is carried out at an elevated temperature (e.g., from about 300° F. to about 400° F., for a period of time from about 1 minute to 10 minutes, the time and temperature of course usually being roughly inversely related), and such heating is believed to advance the reaction of the modified resin.

The thus-treated fabric bearing the adhesive solids deposit is thereafter laminated to the desired vulcanizable rubber stock by any suitable conventional method such as calendering, compression molding, extruding or injecting onto the fabric, etc.

Thereafter, the laminate is simply subjected to conventional vulcanizing conditions in the usual manner to convert the rubber stock into a vulcanizate having the desired physical properties appropriate to the particular laminated article being manufactured. While it is not desired to limit the invention to any particular theory of operation, it appears to be possible that the exposure of the laminate to elevated temperature during the vulcanization gives rise to some kind of physico-chemical bonding reaction between the textile and the rubber at the interface thereof through the agency of the THEIC modified resorcinol-formaldehyde resin deposited on the surface of and/or in the interstices of the textile material. In any case, there is evidence of an unusual cooperation between the members of the laminate prepared as described, in the form of remarkably improved adhesion, in comparison to an otherwise similar laminate made using unmodified resorcinol-formaldehyde resin in place of the THEIC modified resorcinol-formaldehyde resin of the invention.

The following examples, in which all quantities are expressed by weight unless otherwise indicated, will serve to illustrate the practice of the invention in more detail.

EXAMPLE I

I–(i)(a). Preparation of unmodified RF (resorcinol-formaldehyde) resin

Two hundred grams of resorcinol (1.82 moles) is dissolved in 200 ml. of water. Four grams of oxalic acid dihydrate is added as a catalyst. The mixture is heated to reflux. 98 grams of 37% formalin (1.21 moles of formaldehyde) is added dropwise over a 15 minute period.

I-(i)(b). Modification of RF resin with THEIC

At the conclusion of the addition of formaldehyde, while continuing the refluxing, 15 grams of tris(2-hydroxyethyl)isocyanurate ("THEIC") dissolved in 25 ml. of water is added. This amount of THEIC corresponds to 6% by weight, based on the weight of the resorcinol and formaldehyde (dry basis). The entire mixture is refluxed for 15 minutes more. Upon cooling, 20 grams of sodium hydroxide dissolved in 100 ml. of water is added. The pH of this modified resin solution is 8.3; the solids content of the resin solution is 38.3%. The solution is stable indefinitely. The resin solution is stored for two days.

I-(ii). Application of THEIC-modified RF resin to cord

An adhesive dip may be prepared according to the following formulation, using the THEIC-modified resin solution resulting from Step I-(i)(b).

| | Parts |
|---|---|
| Modified resin solution from Step I-(i)(b) (38.3% solids) | 15 |
| Vinylpyridine terpolymer rubber latex (40% solids) | 100 |
| Formalin (37% formaldehyde) | 1.6 |

The vinylpyridine terpolymer in the latex contains 85% butadiene, 10% vinylpyridine, and 5% styrene. The adhesive dip thus formed contains about 14.5 parts of modified resin solids per 100 parts of rubber solids, and about 10 parts of formaldehyde per 100 parts of modified resin solids. Rayon tire cord is dipped in the foregoing solution, and removed.

I-(iii). Drying the treated cord

The cord is then exposed to a temperature of 350° F. for about 4 minutes in a circulating air oven to dry the cord and cure the resin.

I-(iv). Laminating treated cord to rubber

An adhesion pad is prepared by applying a calendered layer of vulcanizable rubber stock approximately 0.015 inch thick to each side of treated cords in parallel arrangement, 24 ends to the inch. Aluminum strips are inserted between the rubber and the fabric at one end of the test pad to permit later separation of the ends for gripping by the jaws of a tear testing machine.

The rubber stock may be made by milling 70 parts of oil-extended SBR (52.5 parts polymer [containing, e.g., 23% styrene] and 17.5 parts of oil [e.g., napthenic type petroleum hydrocarbon extender oil]), 50 parts of natural rubber and 50 parts of carbon black, after which the following ingredients may be mixed into the batch in conventional manner: 1.5 parts of stearic acid, 25 parts of reclaimed rubber, 10 parts of zinc oxide, 1 part of acetone-diphenylamine antioxidant (BLE), 5 parts of pine tar softener, 1 part of benzothiazyl disulfide accelerator (MBTS), 0.1 part of diphenyl guanidine accelerator (DPG), and 3.2 parts of sulfur.

I-(v). Vulcanization of laminate

The test pad is placed in a mold and heated for about 8 minutes at 330° F. to vulcanize the rubber stock.

I-(vi). Evaluation of the adhesion

The test pad is removed from the mold and cut into strips 1 inch by 3 inches, with the cords running lengthwise. The aluminum strips are removed from the end of the pad. The separated ends are gripped in the jaws of a tear testing machine (an Instron tester) and the force in pounds required to separate the test strip at a jaw separation rate of 5 inches per minute is measured. The separated surface is then examined to see how much of the cord has become visible due to stripping of the rubber from the cord. This is recorded according to the following scale:

| Rating | Appearance |
|---|---|
| 5—100% Rubber failure | No Cord visible. |
| 4—75% Rubber failure | 25% Cord visible. |
| 3—50% Rubber failure | 50% Cord visible. |
| 2—25% Rubber failure | 75% Cord visible. |
| 1—No Rubber failure | 100% Cord visible. |

Thus, the highest value on the scale indicates that the adhesive bond was so strong that the failure occurred in the rubber stock; the lowest value on the scale indicates the weakest adhesive bond, failure having occurred at the interface of the rubber stock and the cord rather than in the rubber stock itself.

In the test pad of this example, the adhesion value is 33.0 pounds and the appearance is rated 4.2. In an otherwise similar run, from which the THEIC is omitted (i.e., an ordinary unmodified resorcinol-formaldehyde resin is substituted for the THEIC-modified resin), the adhesion value is only 27.8 and the appearance rating drops 3.0. These results are summarized in Table I.

TABLE I

| | Adhesion (lbs.) | Appearance |
|---|---|---|
| I-1 THEIC-modified resin | 33.0 | 4.2 |
| I-2 Control (unmodified resin) | 22.6 | 2.7 |

If the THEIC is simply added to the adhesive solution (that is, a dip composed of the control [unmodified] RF resin, latex and formaldehyde), without prior reaction with the resin as in Step I-(i)(a), the adhesion test results show no significant improvement over the control. This emphasizes the need for prereaction of the RF resin with the THEIC modifying agent, in accordance with the invention.

EXAMPLE II

Example I is repeated exactly, except that in part I-(i)(b) the amount of THEIC is varied, in a series of runs as shown in Table II, to provide (in addition to a control containing no THEIC) a series of resins modified with increasing amounts of THEIC, from 1% up to 12%. After formulating with latex, treating the rayon cord, drying, laminating to rubber stock, and vulcanizing the rubber, as in Example 1, the resulting adhesion test pads yield the results shown in Table II.

TABLE II

| Resin | Adhesion (lbs.) | Appearance |
|---|---|---|
| II-1 Control (no THEIC) | 22.6 | 2.7 |
| II-2 1% THEIC | 34.5 | 4.0 |
| II-3 2% THEIC | 35.0 | 4.0 |
| II-4 3% THEIC | 34.0 | 4.3 |
| II-5 4% THEIC | 32.5 | 4.5 |
| II-6 5% THEIC | 32.0 | 4.8 |
| II-7 6% THEIC | 32.0 | 4.9 |
| II-8 12% THEIC | 36.0 | 4.8 |

The optimum results are obtained at the 5-6% THEIC content.

EXAMPLE III

Example I is repeated, except that no catalyst is employed in making the initial resin in Step I-(i)(a). After modifying the RF resin with THEIC as in Step I-(i)(b), the described adhesive dip is prepared, rayon tire cord is treated, and adhesion test pads are prepared and tested. The results are shown in Table III.

TABLE III

| Resin | Adhesion (lbs.) | Appearance |
|---|---|---|
| III-1 THEIC modified resin prepared without catalyst. | 30.7 | 4.3 |
| III-2 Control (unmodified resin) | 21.0 | 2.0 |

EXAMPLE IV

Example I is repeated, except that glass tire cord is used in place of rayon cord. Two tests are carried out, with the results shown in Table IV.

Penetration of the glass cord by the composition of the invention containing the THEIC resin is excellent, and far superior to the case when unmodified RF resin is used. Also, the THEIC resin-based adhesive composition resulted in better tackiness of the cord.

TABLE IV

| | Adhesion (lbs.) | Appearance | Penetration |
|---|---|---|---|
| Test No. 1: | | | |
| Control (unmodified resin) | 32.0 | 4.0 | Fair. |
| THEIC modified resin | 36.0 | 4.5 | Excellent. |
| Test No. 2: | | | |
| Control (unmodified resin) | 33.0 | 4.5 | Fair. |
| THEIC modified resin | 41.8 | 4.8 | Excellent. |

EXAMPLE V

This example illustrates the preferred form of the invention in which the RF resin is prepared from molten resorcinol, rather than an aqueous solution of resorcinol.

(a) Preparation of unmodified RF resin

Two hundred grams of resorcinol (1.82 moles) is melted with 4 grams of oxalic acid dihydrate as a catalyst in a flask equipped with a dropping funnel, a reflux condenser and a stirrer. After heating the resorcinol-catalyst molt at 125–135°, for about 30 minutes, the heating is discontinued and the temperature of the molt is allowed to drop to about 90–95° C. At this point addition of 98 grams of 37% formalin (1.21 moles of formaldehyde) is begun, dropwise. An exothermic resin-forming reaction sets in and the rate of addition is so regulated that the mixture refluxes at a pot temperature of 95 to 100° C. Addition of the formalin takes 15 minutes to complete.

(b) Modification of RF resin with THEIC

The conclusion of the addition of formaldehyde, while continuing the refluxing, 15 grams of tris(2-hydroxyethyl)isocyanurate ("THEIC") dissolved in 25 ml. of water is added. This amount of THEIC corresponds to 6% by weight based on the weight of the resorcinol and formaldehyde (dry basis). The entire mixture is refluxed for 15 minutes more. The pH of this resin solution is 1.0; the solids content of the resin solution is 68.0%. It is stable indefinitely.

An adhesive dip is prepared using 15 parts of the just described resin solution, 100 parts of rubber latex, and 1.6 parts of formalin, as described in Example I. Rayon tire cord is dipped in the solution, and dried and cured at 350° F. as described in Example I. Laminates to rubber stock are prepared, vulcanized, and evaluated as described in Example I. The adhesion value is 37.0 pounds, appearance rating 4.7. In an otherwise similar run, in which water is added to the resorcinol to dissolve it in Step (a) instead of melting the resorcinol, the adhesion value is 36.5 lbs. and the appearance rating is 4.6. From these figures it can be seen that the molt-prepared resin gives superior results. In another otherwise similar molt-resin run, from which the THEIC modification Step (b) is omitted, the resin is unstable and forms a hard, yellow solid which cannot be used for the present purposes. These results are summarized in Table V.

TABLE V

[Rayon cord—molt resin v. solution resin]

| Resin | Adhesion | Appearance |
|---|---|---|
| THEIC=modified molt resin | 37.0 | 4.7 |
| TEHIC=modified solution resin | 36.5 | 5.6 |
| Unmodified molt resin | (insoluble resin) | |

The procedure of the foregoing example may be repeated, except that the THEIC is added to the molten resorcinol-catalyst mixture, prior to addition of the formalin, with equivalent results.

EXAMPLE VI

Example V is repeated, except that nylon tire cord is used in place of rayon tire cord. The adhesion value with THEIC-modified RF resin made from molten resorcinol is 36.5 lbs., the appearance rating is 4.9.

EXAMPLE VII

Example V is repeated, using polyester (polyethyl terephthalate) tire cord (see, e.g., U.S. Pat. 3,216,187, Chantry). The adhesion value with THEIC-modified resin made from molten resorcinol is 44.0 lbs., appearance 5.0.

EXAMPLE VIII

Glass tire cord is used according to the procedure of Example V. The THEIC modified RF resin from molten resorcinol gives an adhesion value of 36.0 lbs. and an appearance of 4.9.

The foregoing examples may be repeated using other polyhydric phenols (e.g. catechol, pyrogallol) besides resorcinol, and/or other tris(2-hydroxyalkyl) isocyanurates [e.g. tris(2-hydroxypropyl)isocyanurate, tris-(2-hydroxybutyl)isocyanurate] besides THEIC.

Having thus described our invention, what we claim and desire to protect by Letters Patent is:

1. An improved adhesive resin which is a reaction product of a polyhydric phenol, formaldehyde, and a tris(2-hydroxyalkyl)isocyanurate, the amount of tris(2-hydroxyalkyl)isocyanurate being from 1 to 15% by weight, based on the weight of polyhydric phenol plus formaldehyde, and the amount of formaldehyde being from 0.15 to 0.45 mole per molar equivalent of phenolic hydroxyl in the polyhydric phenol.

2. An improved adhesive resin as in claim 1 in which the polyhydric phenol is resorcinol and the tris(2-hydroxyalkyl)isocyanurate is tris(2-hydroxyethyl)isocyanurate.

3. An improved modified resorcinol-formaldehyde adhesive resin which is a reaction product of (a) and (b),
the said (a) being a preformed water soluble resinous condensation product of (i) and (ii),
the said (i) being a molten mixture of resorcinol with a small, catalytic amount of resorcinol-formaldehyde condensation resin forming catalyst, and
the said (ii) being formaldehyde, in ratio of 0.3 to 0.9 mole of formaldehyde per mole of resorcinol, and
the said (b) being tris(2-hydroxyethyl)isocyanurate in amount of from 1% to 15%, based on the weight of (a).

4. A method of making an adhesive resin as in claim 1 in which the formaldehyde is added as an aqueous solution to the polyhydric phenol, and the mixture is heated at a temperature of from 90° to 135° C. to form an aqueous solution of the resin, the said tris(2-hydroxyalkyl)isocyanurate being present in the reaction mixture of polyhydric phenol and formaldehyde, or being added to the resin solution subsequently to formation of the resin followed by heating of the solution to a temperature of 60°–160° C.

5. A method of making an improved modified resorcinol-formaldehyde adhesive resin comprising melting resorcinol with a small, catalytic amount of a resorcinol-formaldehyde condensation resin forming catalyst, adding aqueous formaldehyde to the resorcinol-catalyst mixture, the amount of formaldehyde being from 0.3 to 0.9 mole, per mole of resorcinol, heating the mixture at a temperature of from 90° to 135° C. to form resorcinol-formaldehyde resin, subsequently adding tris(2-hydroxyethyl)-isocyanurate to the resulting aqueous solution of resorcinol-formaldehyde resin in amount of from 1% to 15% by weight based on the weight of resorcinol-formaldehyde resin, and heating the mixture at a temperature of from 60° to 160° C. to form the finally desired modified adhesive resin.

6. An aqueous adhesive dip for improving the adhesion of textile fiber to rubber comprising
   (i) an aqueous solution of polyhydric phenolformaldehyde-tris(2-hydroxyalkyl)isocyanurate resin as in claim 1,
   (ii) rubber latex and
   (iii) formaldehyde;
the amount of said modified resin being from 5 to 25 parts by weight per 100 parts of solids in (ii), and the amount of (iii) being from 5 to 30 parts by weight, per 100 parts of said modified resin.

7. An aqueous adhesive dip as in claim 6 in which the polyhydric phenol is resorcinol and the tris-(2-hydroxyalkyl)isocyanurate is tris(2-hydroxyethyl)isocyanurate.

8. An aqueous adhesive dip for improving the adhesion of textile fiber to rubber comprising
   (i) an aqueous solution of tris(2-hydroxyethyl)isocyanurate modified resorcinol-formaldehyde resin as in claim 3,
   (ii) rubber latex, and
   (iii) formaldehyde;
the amount of said modified resin being from 5 to 25 parts by weight per 100 parts of solids in (ii), and the amount of (iii) being from 5 to 30 parts by weight, per 100 parts of said modified resin.

9. A method of adhering textile fiber to rubber comprising applying to the textile an aqueous adhesive dip as in claim 6, heating the thus-treated textile at a temperature of from 300° F. to 400° F., for a period of from 1 minute to 10 minutes, thereafter laminating the textile to vulcanizable rubber stock, and vulcanizing the rubber stock, whereby the rubber stock becomes firmly bonded to the textile through the agency of the deposit from said adhesive dip at the interface between the textile and the rubber.

10. A method as in claim 9 in which the textile fiber is rayon, nylon, polyester or glass, the polyhydric phenol is resorcinol and the tris(2-hydroxyalkyl)isocyanurate is tris(2-hydroxyethyl)isocyanurate.

11. A method of adhering textile fiber to rubber comprising applying to the textile an aqueous adhesive dip as in claim 8, heating the thus-treated textile at a temperature of from 300° F. to 400° F., for a period of from 1 minute to 10 minutes, thereafter laminating the textile to vulcanizable rubber stock, and vulcanizing the rubber stock, whereby the rubber stock becomes firmly bonded to the textile through the agency of the deposit from said adhesive dip at the interface between the textile and the rubber.

12. A laminate of a textile fiber to a vulcanized rubber stock, the textile being adhesively bonded to the rubber stock through the agency of a deposit on the textile, forming an interface between the textile and the rubber stock, of an adhesive deposited from an adhesive dip as in claim 6.

13. A laminate as in claim 12 in which the textile fiber is rayon, nylon, polyester or glass, the polyhydric phenol is resorcinol and the tris(2-hydroxyalkyl)isocyanurate is tris(2-hydroxyethyl)isocyanurate.

14. A laminate of a textile fiber to a vulcanized rubber stock, the textile being adhesively bonded to the rubber stock through the agency of a deposit on the textile, forming an interface between the textile and the rubber stock, of an adhesive deposited from an adhesive dip as in claim 8.

15. A laminate as in claim 14 in which the textile fiber is nylon or polyester.

References Cited
UNITED STATES PATENTS

| | | | |
|---|---|---|---|
| Re. 23,451 | 1/1952 | Mighton | 161—241XR |
| 2,557,625 | 6/1951 | Adams | 260—2 |
| 3,262,482 | 7/1966 | Clifton et al. | 161—243XR |
| 3,318,750 | 5/1967 | Aitken | 161—227XR |
| 3,392,082 | 7/1968 | Lloyd et al. | 161—198XR |
| 3,431,241 | 3/1969 | Moult et al. | 156—335XR |
| 3,476,701 | 11/1969 | Aldred et al. | 117—161 |

JOHN T. GOOLKASIAN, Primary Examiner

D. J. FRITSCH, Assistant Examiner

U.S. Cl. X.R.

156—110, 331, 335; 161—227, 231, 241, 257; 260—29.3, 51.5, 54, 845, 846, 848